(12) United States Patent
Suzuki et al.

(10) Patent No.: US 8,357,472 B2
(45) Date of Patent: *Jan. 22, 2013

(54) FUEL CELL SYSTEM

(75) Inventors: Masaharu Suzuki, Utsunomiya (JP); Kentaro Nagoshi, Utsunomiya (JP)

(73) Assignee: Honda Motor Co., Ltd., Tokyo (JP)

(*) Notice: Subject to any disclaimer, the term of this patent is extended or adjusted under 35 U.S.C. 154(b) by 776 days.

This patent is subject to a terminal disclaimer.

(21) Appl. No.: 12/413,143

(22) Filed: Mar. 27, 2009

(65) Prior Publication Data

US 2009/0246597 A1    Oct. 1, 2009

(30) Foreign Application Priority Data

Mar. 27, 2008 (JP) ................. 2008-083583

(51) Int. Cl.
*H01M 8/04* (2006.01)

(52) U.S. Cl. ......... 429/415; 429/444; 429/446; 429/454

(58) Field of Classification Search .............. None
See application file for complete search history.

(56) References Cited

U.S. PATENT DOCUMENTS

| | | | |
|---|---|---|---|
| 5,441,821 A | 8/1995 | Merritt et al. | |
| 6,689,499 B2 * | 2/2004 | Gillett et al. | 429/429 |
| 6,908,701 B2 * | 6/2005 | Corey et al. | 429/444 |
| 7,105,243 B2 | 9/2006 | Morishima et al. | |
| 8,029,939 B2 * | 10/2011 | Andreas-Schott et al. | 429/454 |
| 2003/0039869 A1 * | 2/2003 | Murakami et al. | 429/13 |
| 2007/0160890 A1 * | 7/2007 | Fischer | 429/34 |

FOREIGN PATENT DOCUMENTS

JP     2004-95528     3/2004

OTHER PUBLICATIONS

Chinese Office Action for Application No. 200910008366.2, dated May 17, 2011.

* cited by examiner

*Primary Examiner* — John S Maples
(74) *Attorney, Agent, or Firm* — Nelson Mullins Riley & Scarborough LLP; Anthony A. Laurentano

(57) ABSTRACT

A fuel cell system includes a fuel cell stack formed by stacking a plurality of power generation cells, and an ejector for supplying a fuel gas to the fuel cell stack. A flow rectifier member is provided at a portion connecting an end plate of the fuel cell stack and the ejector. The flow rectifier member is a cylindrical member. A plurality of openings are formed between partition walls formed in the flow rectifier member.

9 Claims, 15 Drawing Sheets

FUEL CELL SYSTEM

BACKGROUND OF THE INVENTION

1. Field of the Invention

The present invention relates to a fuel cell system including a fuel cell stack formed by stacking a plurality of power generation cells, and a reactant gas supply mechanism having an ejector for supplying a reactant gas to a fuel cell stack, and returning the reactant gas discharged from the fuel cell stack after consumption to the fuel cell stack.

2. Description of the Related Art

For example, a solid polymer electrolyte fuel cell employs an electrolyte membrane (electrolyte) comprising a polymer ion exchange membrane. The electrolyte membrane is interposed between an anode and a cathode to form a membrane electrode assembly (electrolyte electrode assembly). The membrane electrode assembly is sandwiched between separators to form a power generation cell. In use, normally, a predetermined number of power generation cells are stacked together to form a fuel cell stack.

In the fuel cell, a fuel gas such as a hydrogen gas is supplied to the anode, and a fuel off gas containing the fuel gas which has not been consumed in the power generation reaction is discharged from the fuel cell. Therefore, in the fuel cell, in the interest of economy, in order to effectively use the fuel gas, in general, the fuel off gas is supplied again to the anode as the fuel gas.

For example, as shown in FIG. 15, a fuel cell system disclosed in Japanese Laid-Open Patent Publication No. 2004-095528 includes a hydrogen supply channel 3 for supplying hydrogen from a hydrogen supply apparatus 1 to a fuel cell 2 (a stack body formed by stacking a plurality of power generation cells 2a), an off gas circulation channel 4 for merging the off gas discharged from the fuel cell 2 into the hydrogen supply channel 3 and supplying the off gas to the fuel cell 2 for recycling the off gas in the fuel cell 2, an ejector pump 5 circulating the off gas to the off gas circulation channel 4, while being capable of controlling the circulation amount of the off gas and mixing the off gas to the hydrogen in the main supply, and a pressure sensor 6 for detecting the pressure of the off gas ejected from the ejector pump 5.

In the case where the ejector pump 5 is provided in the vicinity of the fuel cell 2, since the high pressure hydrogen is ejected from the ejector pump 5 into the hydrogen supply passage of the fuel cell 2, static pressure distribution tends to occur in the hydrogen supply passage. Thus, in the fuel cell 2, in particular, the hydrogen is not sufficiently supplied to the power generation cell 2a provided at the hydrogen inlet, and the power generation performance is lowered undesirably.

SUMMARY OF THE INVENTION

The present invention has been made in consideration of the needs mentioned above, and an object of the present invention is to provide a fuel cell system which makes it possible to distribute, and supply reactant gases uniformly and reliably to each of power generation cells stacked into a fuel cell stack.

The present invention relates to a fuel cell system including a fuel cell stack formed by stacking a plurality of power generation cells in a stacking direction, and a reactant gas supply mechanism. A reactant gas supply passage for supplying at least a fuel gas or an oxygen-containing gas as a reactant gas extends through the fuel cell stack in the stacking direction. The reactant gas supply mechanism has an ejector for supplying the reactant gas to the reactant gas supply passage, and returning the reactant gas discharged from the fuel cell stack after consumption to the reactant gas supply passage.

The reactant gas supply mechanism includes a flow rectifier member for rectifying the reactant gas provided at a portion connecting the ejector and the reactant gas supply passage.

In the present invention, when the reactant gas is ejected from the ejector to the reactant gas supply passage of the fuel cell stack, by the flow rectifier member provided at the portion connecting the ejector and the reactant gas supply passage, the flow of the reactant gas is rectified.

Therefore, in the present invention, the flow rate of the reactant gas is lowered, and improvement in the static pressure distribution is achieved in the reactant gas supply passage. Thus, the reactant gas is uniformly and reliably distributed, and supplied to each of the power generation cells stacked into the fuel cell stack. Thus, power generation performance and the performance of starting operation are improved effectively.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENT

Figure 1:
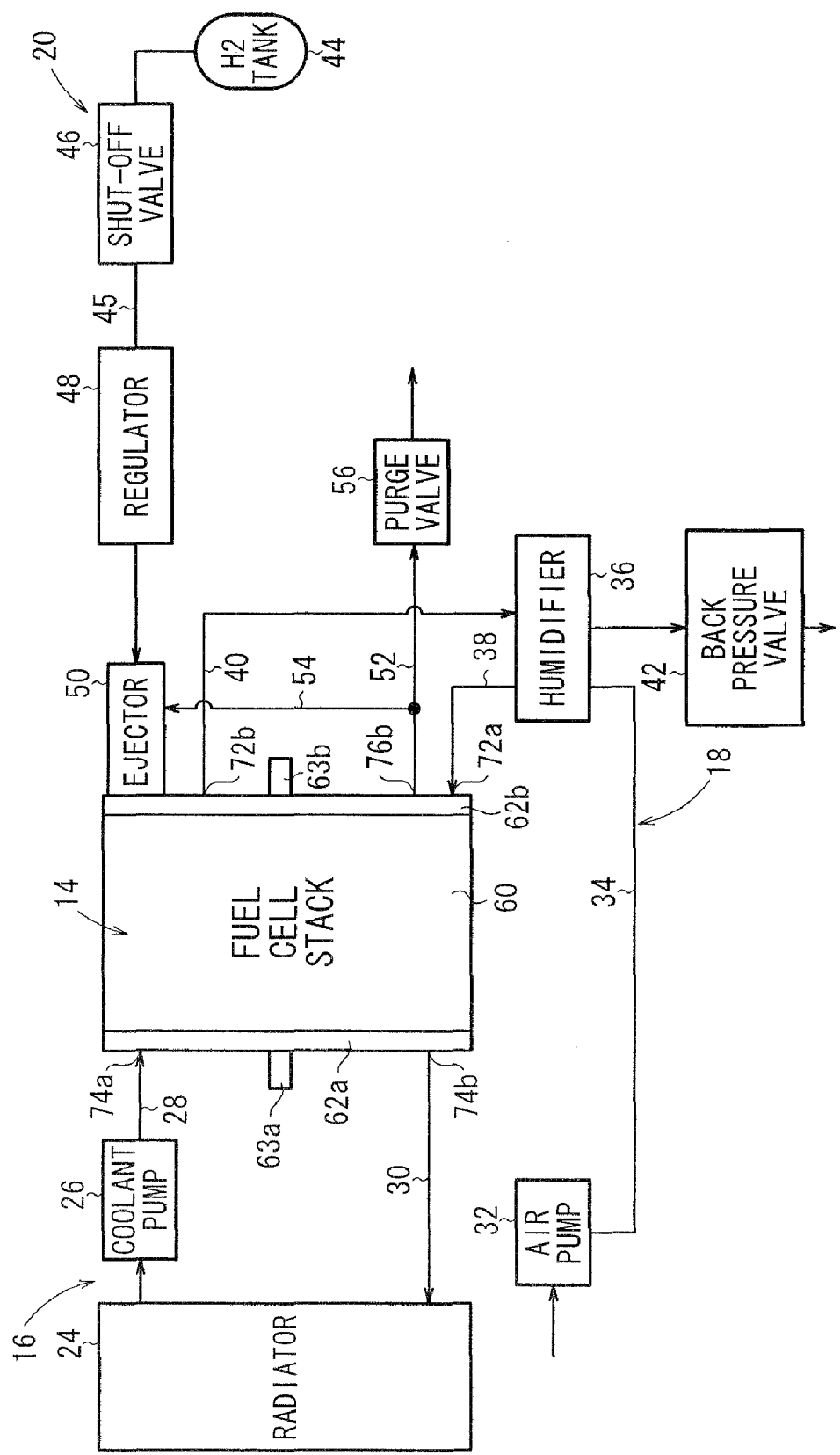
FIG. 1 is a diagram showing structure of a fuel cell system according to a first embodiment of the present invention.

FIG. 1 is a diagram showing structure of a fuel cell system 10 according to a first embodiment of the present invention.

The fuel cell system 10 is mounted in a fuel cell vehicle (not shown). The fuel cell system 10 includes a fuel cell stack 14, a coolant supply mechanism 16 for supplying a coolant to the fuel cell stack 14, an oxygen-containing gas supply mechanism 18 for supplying an oxygen-containing gas (reactant gas) to the fuel cell stack 14, and a fuel gas supply mechanism (reactant gas supply mechanism) 20 for supplying a fuel gas (reactant gas) to the fuel cell stack 14.

The coolant supply mechanism 16 includes a radiator 24. The radiator 24 is connected to a coolant supply pipe 28 through a coolant pump 26, and connected to a coolant discharge pipe 30.

The oxygen-containing gas supply mechanism 18 includes an air pump 32 provided near the coolant pump 26. One end of an air supply pipe 34 is connected to the air pump 32, and the other end of the air supply pipe 34 is connected to a humidifier 36. The humidifier 36 is connected to the fuel cell stack 14 through a humidified air supply pipe 38. An off gas supply pipe 40 for supplying the consumed oxygen-containing gas (hereinafter referred to as the off gas) as humidified fluid is connected to the fuel cell stack 14 and the humidifier 36. A back pressure valve 42 is provided on a side of the humidifier 36, where the off gas supplied through the off gas supply pipe 40 is discharged.

The fuel gas supply mechanism 20 includes a fuel gas tank 44 where a hydrogen gas is stored as a fuel gas. One end of a fuel gas pipe 45 is connected to the fuel gas tank 44, and the other end of the fuel gas pipe 45 is connected to a shut-off valve 46, a regulator 48, and an ejector 50.

An exhaust fuel gas pipe 52 for discharging the consumed fuel containing gas is connected to the fuel cell stack 14. The exhaust fuel gas pipe 52 is connected to the ejector 50 through a return pipe 54, and also connected to a purge valve 56.

Figure 2:
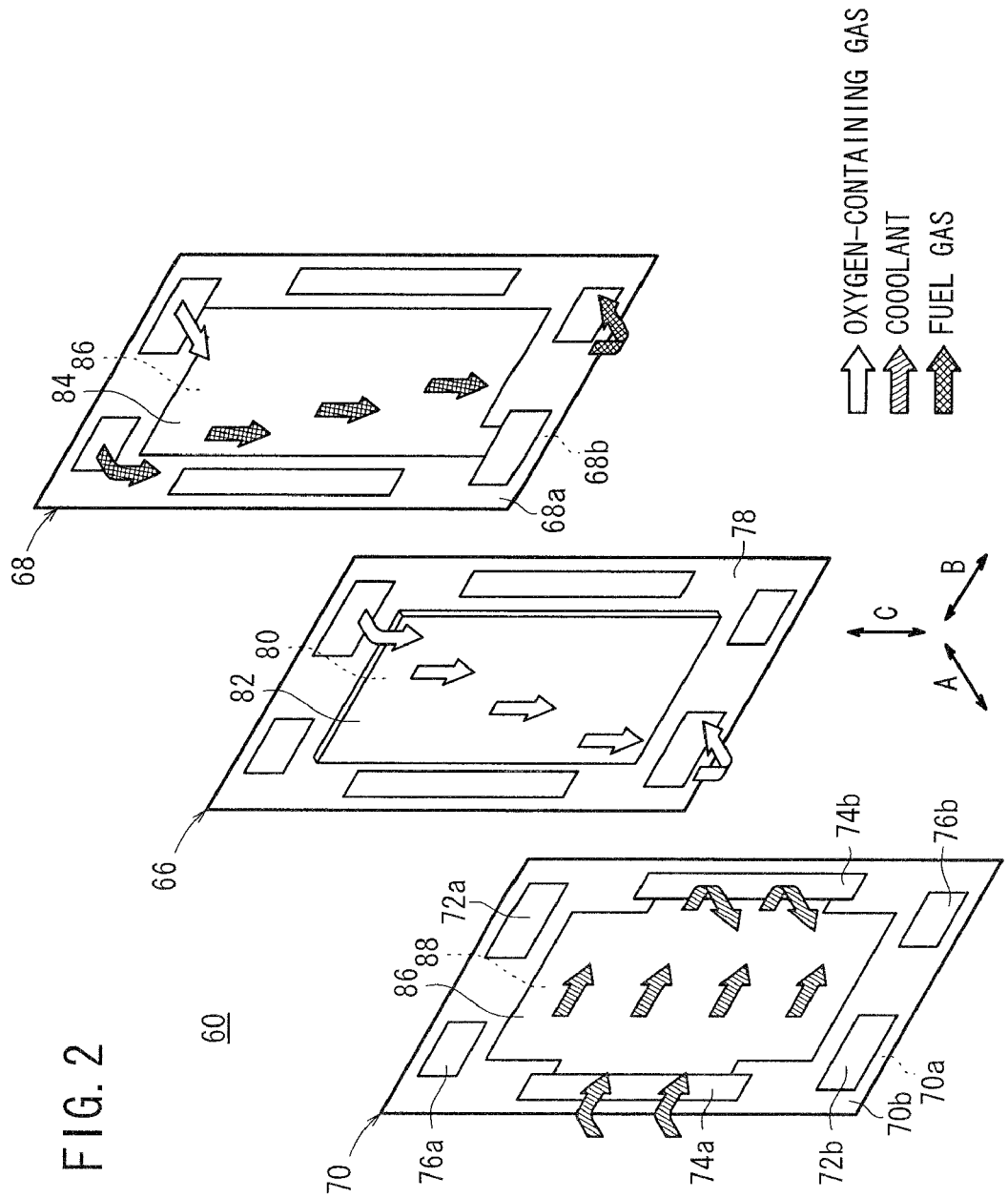
FIG. 2 is an exploded perspective view showing a power generation cell of a fuel cell stack of the fuel cell system.

The fuel cell stack 14 is formed by stacking a plurality of power generation cells 60 horizontally in a direction indicated by an arrow A in FIG. 2. As shown in FIG. 1, at opposite ends of the power generation cells 60 in the stacking direction, metal end plates 62a, 62b are provided through terminal plates and insulating plates (not shown). For example, the fuel cell stack 14 has a casing (not shown) including end plates 62a, 62b. Alternatively, the fuel cell stack 14 has tie-rods (not shown) for tightening components between the end plates 62a, 62b.

Power collecting terminals 63a, 63b are provided at the terminal plates. The power collecting terminals 63a, 63b protrude from the end plates 62a, 62b outwardly in the stacking direction, and are connected to a travel motor and auxiliary devices.

As shown in FIG. 2, each of the power generation cells 60 includes a membrane electrode assembly 66, and first and second separators 68, 70 sandwiching the membrane electrode assembly 66. The power generation cells 60 have a vertically elongated shape. The first and second separators 68, 70 are carbon separators or metal separators.

At one end (upper end) of the power generation cell 60 in a longitudinal direction indicated by an arrow C, an oxygen-containing gas supply passage 72a for supplying an oxygen-containing gas and a fuel gas supply passage (reactant gas supply passage) 76a for supplying a fuel gas such as a hydrogen-containing gas are provided. The oxygen-containing gas supply passage 72a and the fuel gas supply passage 76a extend through the power generation cell 60 in the direction indicated by the arrow A.

At the other end (lower end) of the power generation cell 60 in the longitudinal direction, an oxygen-containing gas discharge passage 72b for discharging the oxygen-containing gas, and a fuel gas discharge passage 76b for discharging the fuel gas are provided. The oxygen-containing gas discharge passage 72b and the fuel gas discharge passage 76b extend through the power generation cell 60 in the direction indicated by the arrow A.

At one end of the power generation cell 60 in a lateral direction indicated by an arrow B, a coolant supply passage 74a for supplying a coolant is provided. At the other end of the power generation cell 60 in the lateral direction, a coolant discharge passage 74b for discharging the coolant is provided. The coolant supply passage 74a and the coolant discharge passage 74b are elongated in the vertical direction.

The membrane electrode assembly 66 includes an anode 80, a cathode 82, and a solid polymer electrolyte membrane 78 interposed between the anode 80 and the cathode 82. The solid polymer electrolyte membrane 78 is formed by impregnating a thin membrane of perfluorosulfonic acid with water, for example.

The first separator 68 has a fuel gas flow field 84 on its surface 68a facing the membrane electrode assembly 66. The fuel gas flow field 84 is connected to the fuel gas supply passage 76a and the fuel gas discharge passage 76b. For example, the fuel gas flow field 84 comprises a plurality of grooves extending in the direction indicated by the arrow C. Further, a coolant flow field 86 is formed on a surface 68b on the back side of the surface 68a of the first separator 68. The coolant flow field 86 is connected to the coolant supply passage 74a and the coolant discharge passage 74b. The coolant flow field 86 comprises grooves extending in the direction indicated by the arrow B.

The second separator 70 has an oxygen-containing gas flow field 88 on its surface 70a facing the membrane electrode assembly 66. The oxygen-containing gas flow field 88 comprises grooves extending in the direction indicated by the arrow C. The oxygen-containing gas flow field 88 is connected to the oxygen-containing gas supply passage 72a and the oxygen-containing gas discharge passage 72b. A surface 70b on the back side of the surface 70a of the second separator 70 is overlapped with the surface 68b of the first separator 68 to form the coolant flow field 86. Though not shown, seal members are provided on the first and second separators 68, 70 as necessary.

Figure 3:
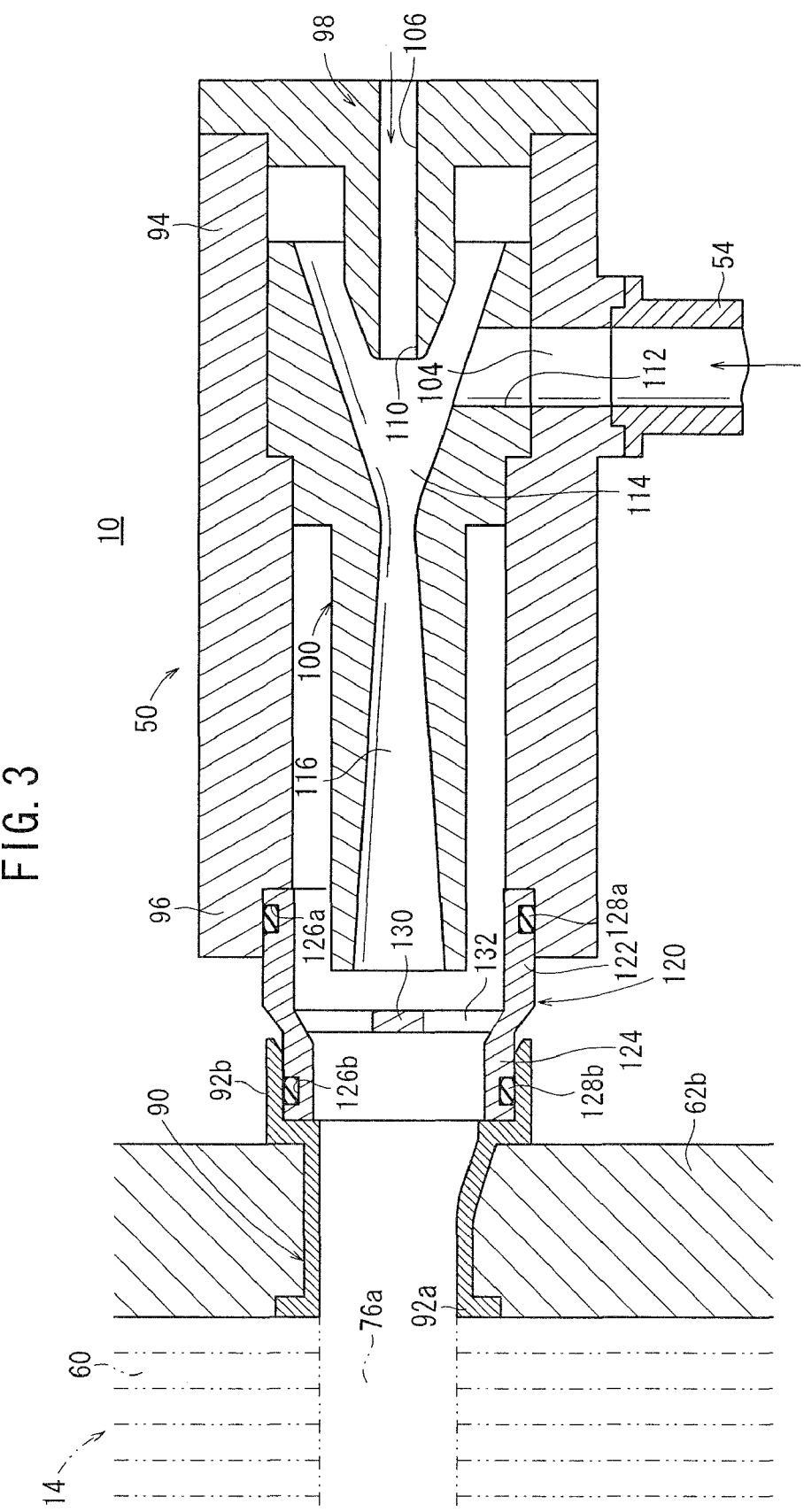
FIG. 3 is a cross sectional view showing main components of the fuel cell system.

As shown in FIG. 3, a resin manifold member 90 is attached to the end plate 62b. The manifold member 90 includes a non-circular cylindrical portion 92a having a shape corresponding to the fuel gas supply passage 76a and a circular cylindrical portion 92b protruding outwardly from the end plate 62b. The non-circular cylindrical portion 92a and the circular cylindrical portion 92b are formed integrally into one piece.

The ejector 50 includes a main body 94 and a cylindrical portion 96. A nozzle 98 and a diffuser 100 are disposed in the main body 94. An off gas channel 104 is formed in the main body 94. A fuel gas channel 106 connected to the fuel gas pipe 45 is formed in the nozzle 98. The fuel gas channel 106 is opened into the diffuser 100 through an injection port 110 provided at the front end of the nozzle 98.

The return pipe 54 is connected to the off gas channel 104, and connected to a suction chamber 114 through a hole 112 formed in the outer circumference of the diffuser 100. The suction chamber 114 is tapered toward the front end, and then, connected to an outlet channel 116. The diameter of the outlet channel 116 is increased continuously toward the downstream side in the flow direction.

Figure 4:
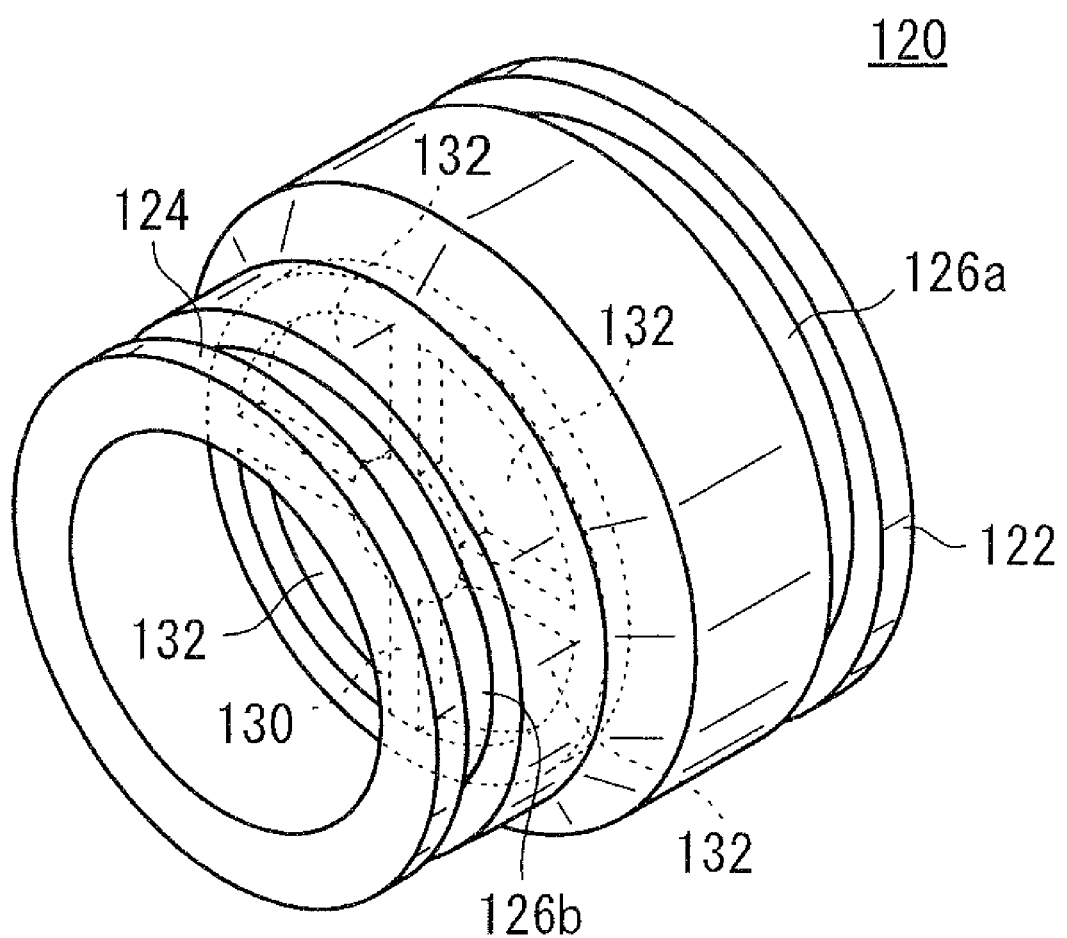
FIG. 4 is a perspective view showing a flow rectifier of the fuel cell system.

A flow rectifier member 120 is provided at a portion connecting the front end of the cylindrical portion 96 and the circular cylindrical portion 92b of the manifold member 90. As shown in FIGS. 3 and 4, the flow rectifier member 120 has a cylindrical shape, and includes a large diameter portion 122 and a small diameter portion 124. The large diameter portion 122 and the small diameter portion 124 are formed integrally into one piece.

An annular groove 126a is formed in the large diameter portion 122, and an annular groove 126b is formed in the small diameter portion 124. The large diameter portion 122 has an O-ring 128a in the annular groove 126a, and the large diameter portion 122 is fitted into the cylindrical portion 96 of the ejector 50. The small diameter portion 124 has an O-ring 128b in the annular groove 126b, and the small diameter portion 124 is fitted into the circular cylindrical portion 92b of the manifold member 90.

Partition walls 130 intersecting with each other at an angle of 90° are provided in the flow rectifier member 120 by partially cutting out the wall surface of the circular plate. Four openings 132 each having a fan shape are formed between the partition walls 130.

Operation of the fuel cell system 10 will be described below.

Firstly, as shown in FIG. 1, the air pump 32 of the oxygen-containing gas supply mechanism 18 is operated to suck the external air as the oxygen-containing gas, and the air is supplied into the air supply pipe 34. The air flows from the air supply pipe 34 into the humidifier 36, and is supplied to the humidified air supply pipe 38.

At this time, as descried later, the oxygen-containing gas consumed in reaction (off gas) is supplied to the off gas supply pipe 40. Thus, water in the off gas moves to the air before consumption, and humidifies the air. The humidified air flows from the humidified air supply pipe 38 to the oxygen-containing gas supply passage 72a in the fuel cell stack 14 through the end plate 62b.

In the fuel gas supply mechanism 20, the shut-off valve 46 is opened, and the pressure of the fuel gas (hydrogen-gas) in the fuel gas tank 44 is decreased by the regulator 48. Thereafter, the fuel gas flows through the ejector 50 to the end plate 62b. Thus, the fuel gas is supplied to the fuel gas supply passage 76a in the fuel cell stack 14.

Further, in the coolant supply mechanism 16, by operation of the coolant pump 26, the coolant flows from the coolant supply pipe 28 to the end plate 62a. Thus, the coolant is supplied into the coolant supply passage 74a in the fuel cell stack 14.

As shown in FIG. 2, after the air is supplied to each of the power generation cells 60 in the fuel cell stack 14, the air flows from the oxygen-containing gas supply passage 72a to the oxygen-containing gas flow field 88 of the second separator 70, and flows along the cathode 82 of the membrane electrode assembly 66 for inducing an electrochemical reaction at the cathode 82. The fuel gas flows from the fuel gas supply passage 76a to the fuel gas flow field 84 of the first separator 68, and flows along the anode 80 of the membrane electrode assembly 66 for inducing an electrochemical reaction at the anode 80.

Thus, in each of the membrane electrode assemblies 66, the oxygen in the air supplied to the cathode 82, and the fuel gas (hydrogen) supplied to the anode 80 are consumed in the electrochemical reactions at catalyst layers of the cathode 82 and the anode 80 for generating electricity.

The air consumed at the cathode 82 flows along the oxygen-containing gas discharge passage 72b, and is discharged as the off gas from the end plate 62b to the off gas supply pipe 40 (see FIG. 1).

Likewise, the fuel gas after partially consumed at the anode 80 flows along the fuel gas discharge passage 76b, and is discharged as the exhaust fuel gas from the end plate 62b to the exhaust fuel gas pipe 52 (see FIG. 1). The exhaust fuel gas discharged to the exhaust fuel gas pipe 52 partially flows through the return pipe 54, and is mixed with the fresh fuel gas by sucking operation of the ejector 50, and then, is supplied to the fuel cell stack 14. The remaining exhaust fuel gas is discharged when the purge valve 56 is opened.

Further, as shown in FIG. 2, the coolant flows from the coolant supply passage 74a to the coolant flow field 86 between the first and second separators 68, 70, and flows in the direction indicated by the arrow B. After the coolant cools the membrane electrode assembly 66, the coolant flows through the coolant discharge passage 74b, and the coolant is discharged from the end plate 62a to the coolant discharge pipe 30. As shown in FIG. 1, after the coolant is cooled by the radiator 24, by operation of the coolant pump 26, the coolant is supplied from the coolant supply pipe 28 to the fuel cell stack 14.

In the first embodiment, as shown in FIG. 3, the fuel gas supplied from the fuel gas pipe 45 to the fuel gas channel 106 of the nozzle 98 is injected to the diffuser 100 from the injection port 110 provided at the front end of the nozzle 98. In the structure, a negative pressure is generated in the suction chamber 114, and the exhaust fuel gas is sucked into the suction chamber 114 from the return pipe 54 through the off gas channel 104.

Therefore, the exhaust fuel gas is mixed with the fuel gas injected from the nozzle 98, and the mixed fuel gas is discharged from the outlet channel 116 of the diffuser 100 to the fuel gas supply passage 76a.

At this time, since the flow rectifier member 120 is provided between the ejector 50 and the end plate 62b and the flow rectifier member 120 has a plurality of, e.g., four openings 132 through partition walls 130 between the outlet channel 116 and the fuel gas supply passage 76a, the flow of the fuel gas discharged from the outlet channel 116 is rectified when it passes through the four openings 132, and then, supplied to the fuel gas supply passage 76a.

In the structure, the flow rate of the fuel gas discharged from the outlet channel 116 at relatively high speed is decreased by the rectifying operation of the flow rectifier member 120. Therefore, improvement in the static pressure distribution in the fuel gas supply passage 76a is achieved. The fuel gas is uniformly and reliably distributed, and supplied to each of the power generation cells 60 stacked into the fuel cell stack 14. Thus, in the fuel cell system according to the embodiment, the power generation performance and the performance of starting operation are improved effectively.

In particular, though the fuel gas does not flow easily into the end power generation cell 60 at one end adjacent to the ejector 50 in comparison with the other power generation cells 60, the fuel gas is reliably supplied, and distributed into the end power generation cell 60.

Further, since the flow rate of the fuel gas ejected from the ejector 50 to the end plate 62b is lowered, the ejector 50 and the fuel cell stack 14 can be provided together.

Although the first embodiment has been described in connection with a case where the fuel gas is circulated as a reactant gas supplied to the fuel cell stack 14, the present invention is not limited in this respect. The present invention is applicable to a case where the oxygen-containing gas is circulated as a reactant gas supplied to the fuel cell stack 14. In particular, the present invention is particularly suitably applicable to a case where pure oxygen is used as the oxygen-containing gas.

Figure 5:
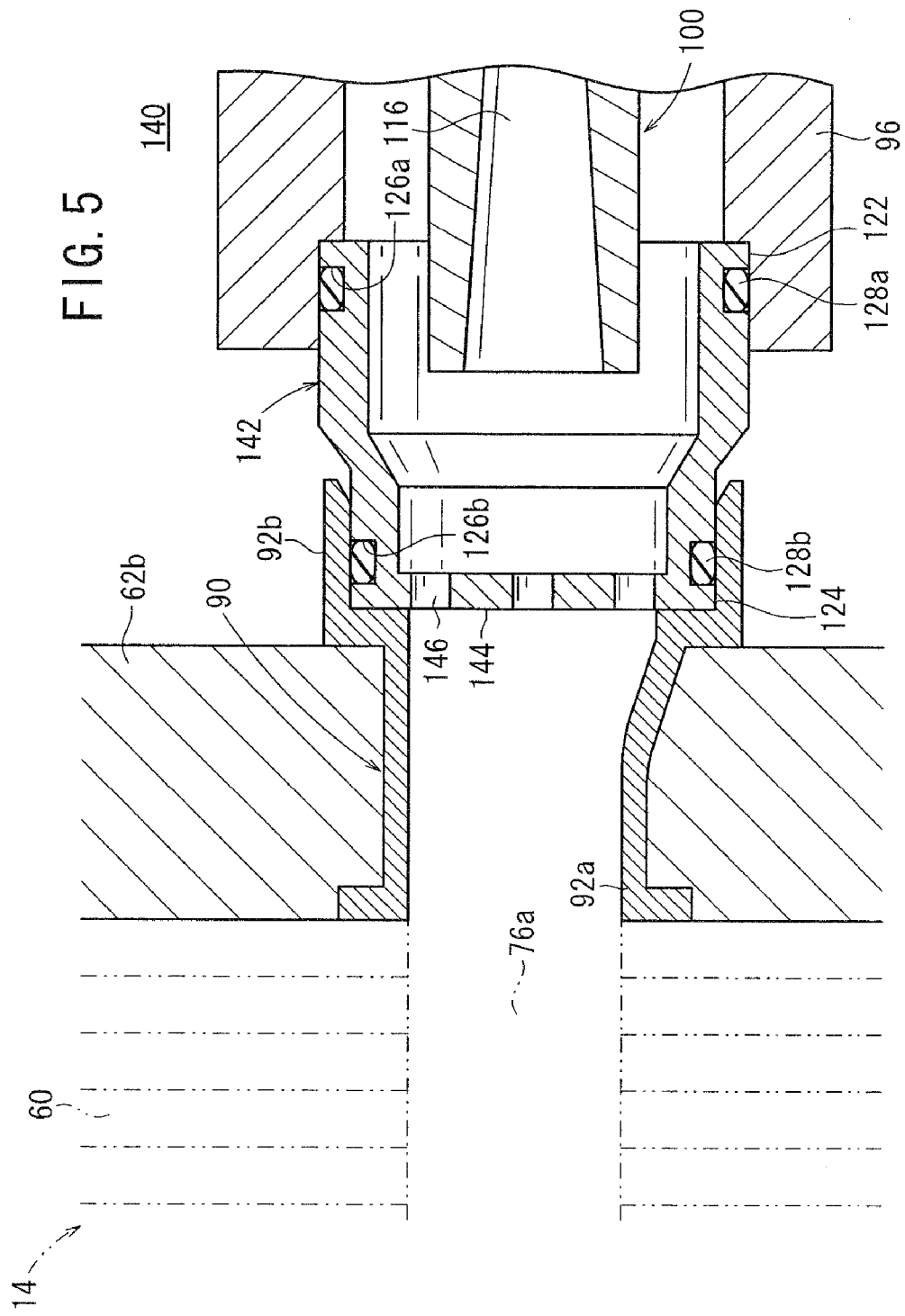
FIG. 5 is a cross sectional view showing main components of a fuel cell system according to a second embodiment of the present invention.

FIG. 5 is a cross sectional view showing main components of a fuel cell system 140 according to a second embodiment of the present invention. The constituent elements that are identical to those of the fuel cell system 10 according to the first embodiment are labeled with the same reference numeral, and detailed description thereof will be omitted. Also in third to seventh embodiments as described later, the constituent elements that are identical to those of the fuel cell system 10 according to the first embodiment are labeled with the same reference numeral, and detailed description thereof will be omitted.

Figure 6:
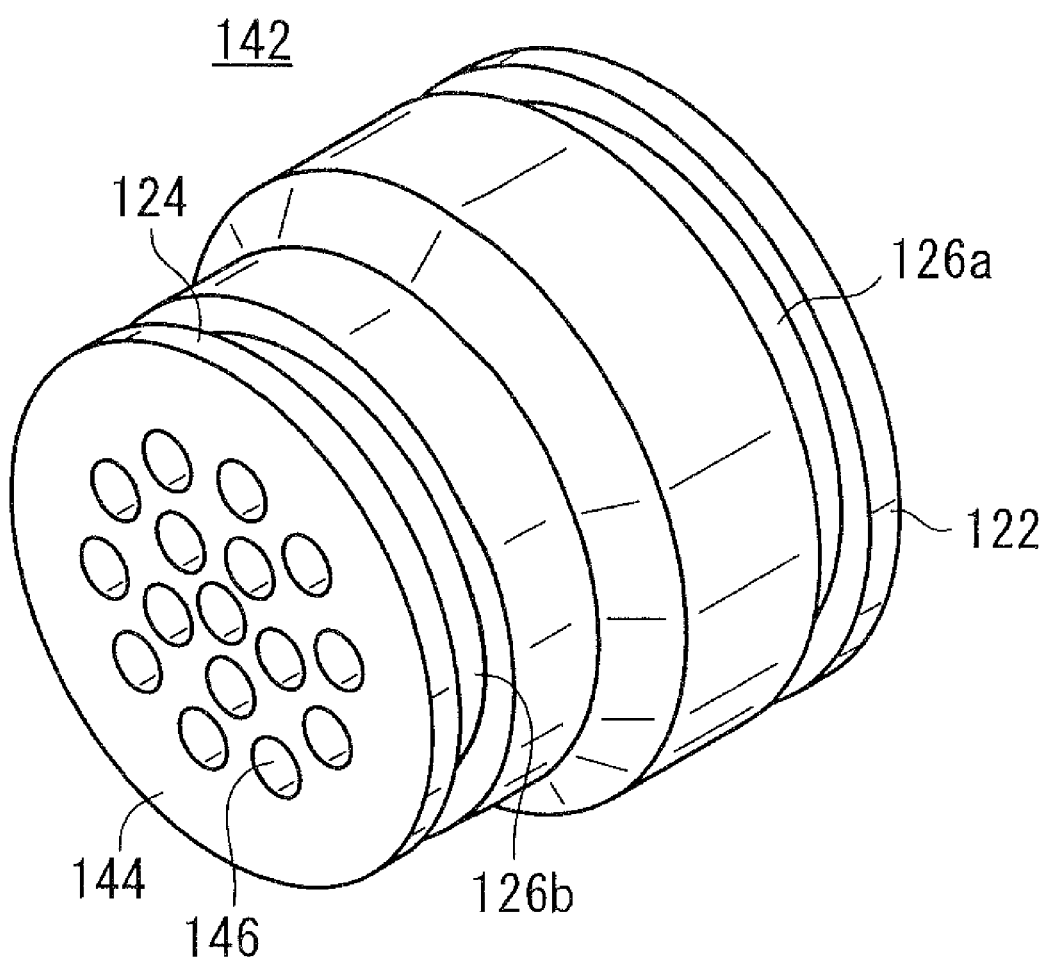
FIG. 6 is a perspective view showing a flow rectifier member of the fuel cell system.

A fuel cell system 140 includes a flow rectifier member 142 provided at a portion connecting the end plate 62b and the ejector 50. The flow rectifier member 142 is a cylindrical member. A wall surface 144 having a circular disk shape is provided at an end of the small diameter portion 124. A plurality of holes (openings) 146 are formed in the wall surface 144 (see FIGS. 5 and 6).

In the second embodiment, the fuel gas ejected from the diffuser 100 contacts the wall surface 144 of the flow rectifier member 142. The fuel gas flows through the holes 146, and then, the fuel gas is supplied to the fuel gas supply passage 76a. In the structure, the flow rate of the fuel gas is lowered when the fuel gas is rectified by the flow rectifier member 142. Accordingly, static pressure distribution in the fuel gas supply passage 76a is effectively reduced.

Thus, in the second embodiment, the same advantages as in the case of the first embodiment are obtained. For example, the fuel gas is uniformly and reliably supplied to each of the power generation cells 60.

Figure 7:
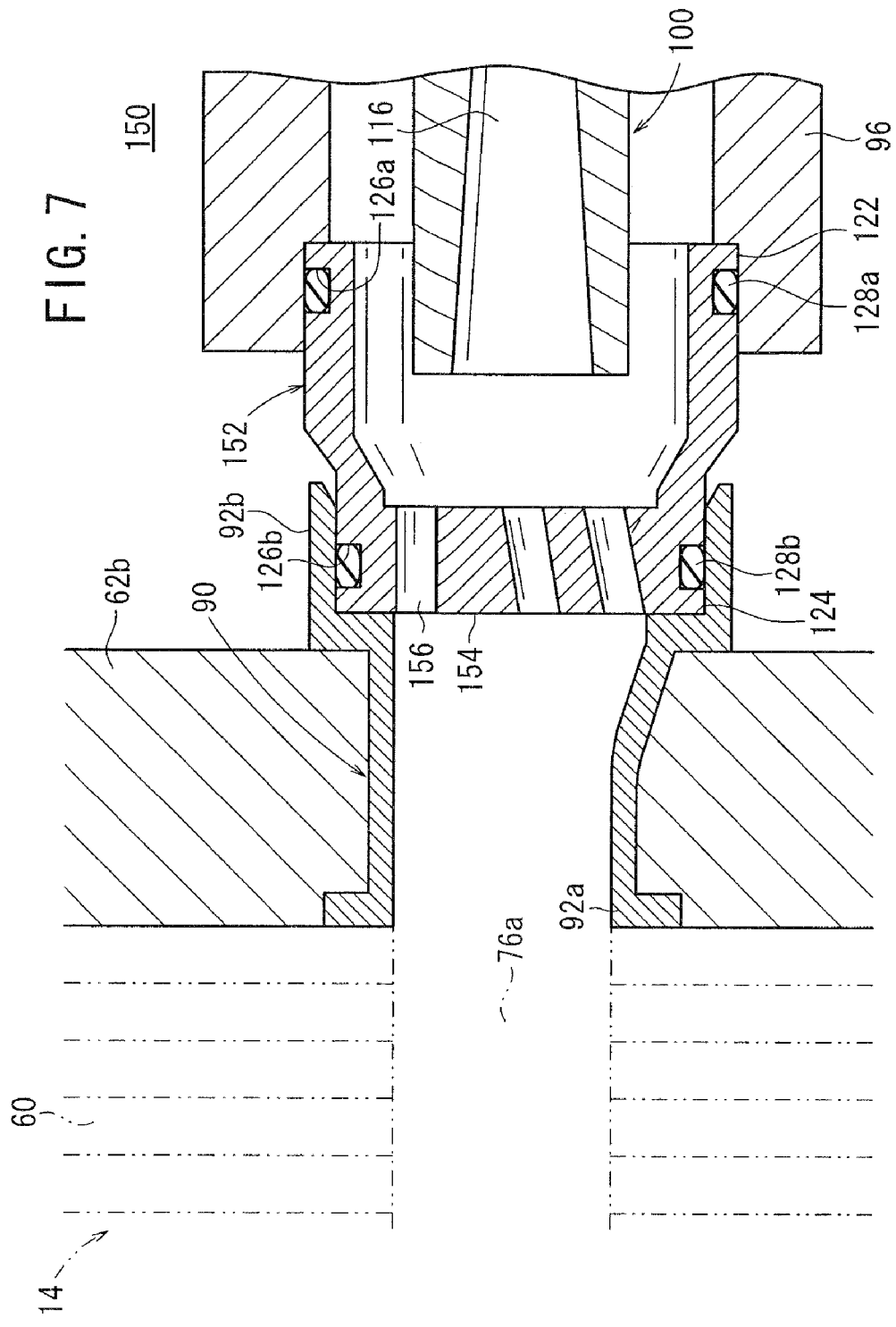
FIG. 7 is a cross sectional view showing main components of a fuel cell system according to a third embodiment of the present invention.

FIG. 7 is a cross sectional view showing main components of a fuel cell system 150 according to a third embodiment of the present invention.

Figure 8:
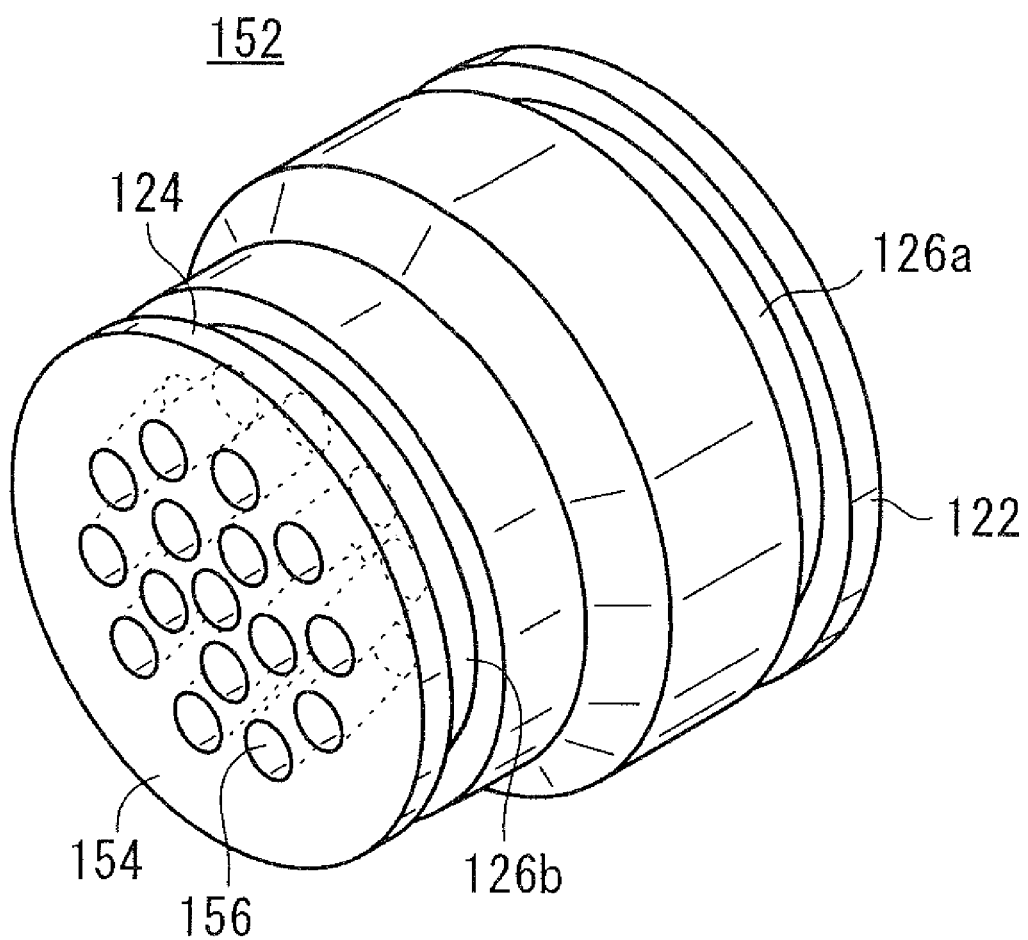
FIG. 8 is a perspective view showing a flow rectifier member of the fuel cell system.

The fuel cell system 150 includes a flow rectifier member 152 provided at a portion connecting the end plate 62b and the ejector 50. The flow rectifier member 152 is a cylindrical member. A wall surface 154 having a circular disk shape is provided at an end of the small diameter portion 124. A plurality of inclined holes (openings) 156 inclined in one direction from the flow direction of the fuel gas are formed in the wall surface 154 (see FIGS. 7 and 8). The inclined holes 156 are inclined toward to the fuel gas supply passage 76a.

In the third embodiment, in particular, for adopting the design of the fuel gas supply passage 76a to have a non-circular shape in cross section, the inclined holes 156 are inclined in correspondence with the shape of the fuel gas supply passage 76a. In the structure, the fuel gas rectified by the flow rectifier member 152 is supplied to the fuel gas supply passage 76a even further reliably and smoothly.

Figure 9:
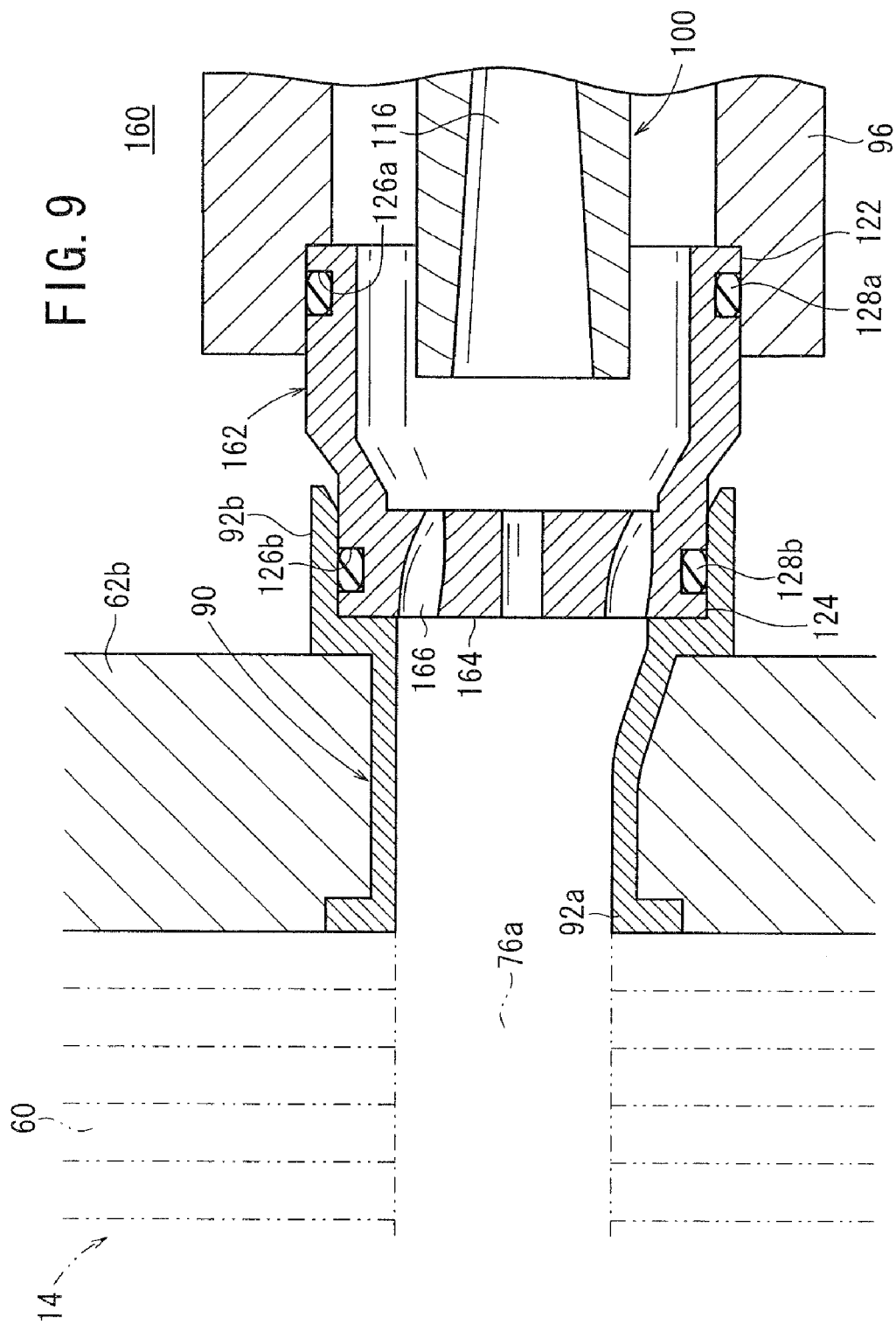
FIG. 9 is a cross sectional view showing main components of a fuel cell system according to a fourth embodiment of the present invention.

FIG. 9 is a cross sectional view showing main components of a fuel cell system 160 according to a fourth embodiment of the present invention.

Figure 10:
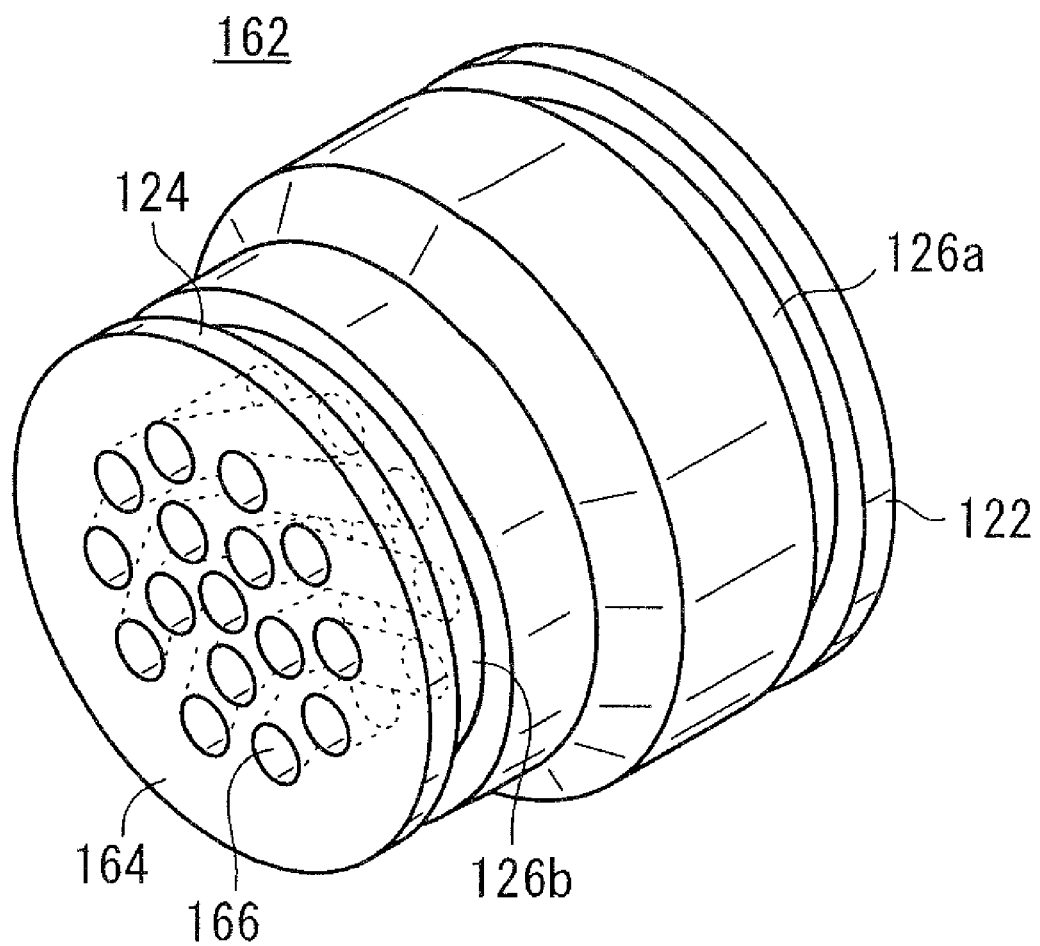
FIG. 10 is a perspective view showing a flow rectifier member of the fuel cell system.

The fuel cell system 160 includes a flow rectifier member 162 provided at a portion connecting the end plate 62b and the ejector 50. The flow rectifier member 162 is a cylindrical member. A wall surface 164 having a circular disk shape is provided at an end of the small diameter portion 124. A plurality of holes (openings) 166 inclined in predetermined directions for forming a swirling flow are formed in the wall surface 164 (see FIGS. 9 and 10).

Thus, in the fourth embodiment, the fuel gas ejected from the diffuser 100 to the flow rectifier member 162 forms a swirling flow when it passes through the holes 166, and then, the fuel gas is supplied to the fuel gas supply passage 76a. In the structure, the swirling fuel gas moves in the stacking direction in the fuel gas supply passage 76a. Accordingly, static pressure distribution is effectively reduced, and the fuel gas is uniformly and reliably supplied to each of the power generation cells 60.

Figure 11:
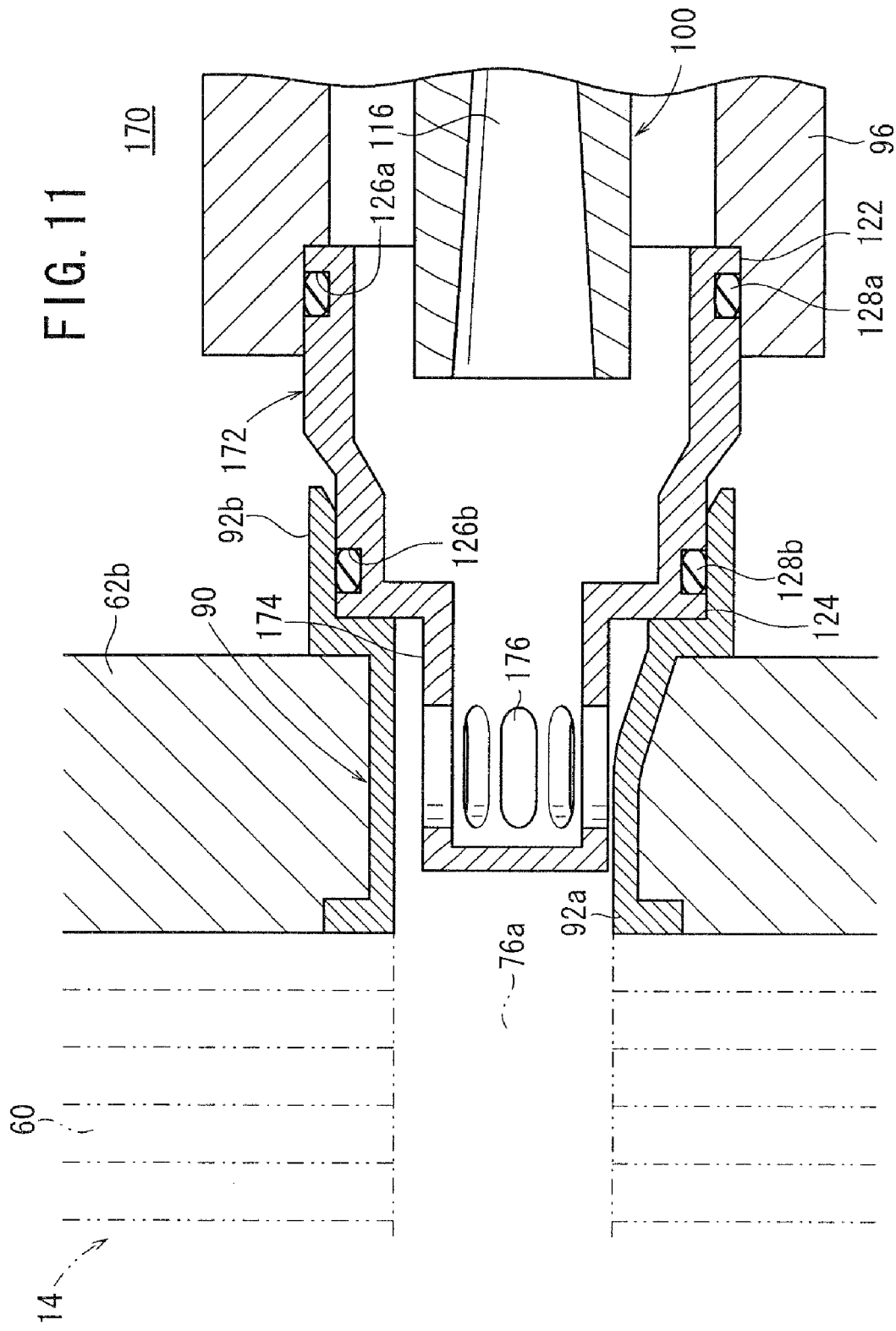
FIG. 11 is a cross sectional view showing a fuel cell system according to a fifth embodiment of the present invention.

FIG. 11 is a cross sectional view showing main components of a fuel cell system 170 according to a fifth embodiment of the present invention.

Figure 12:
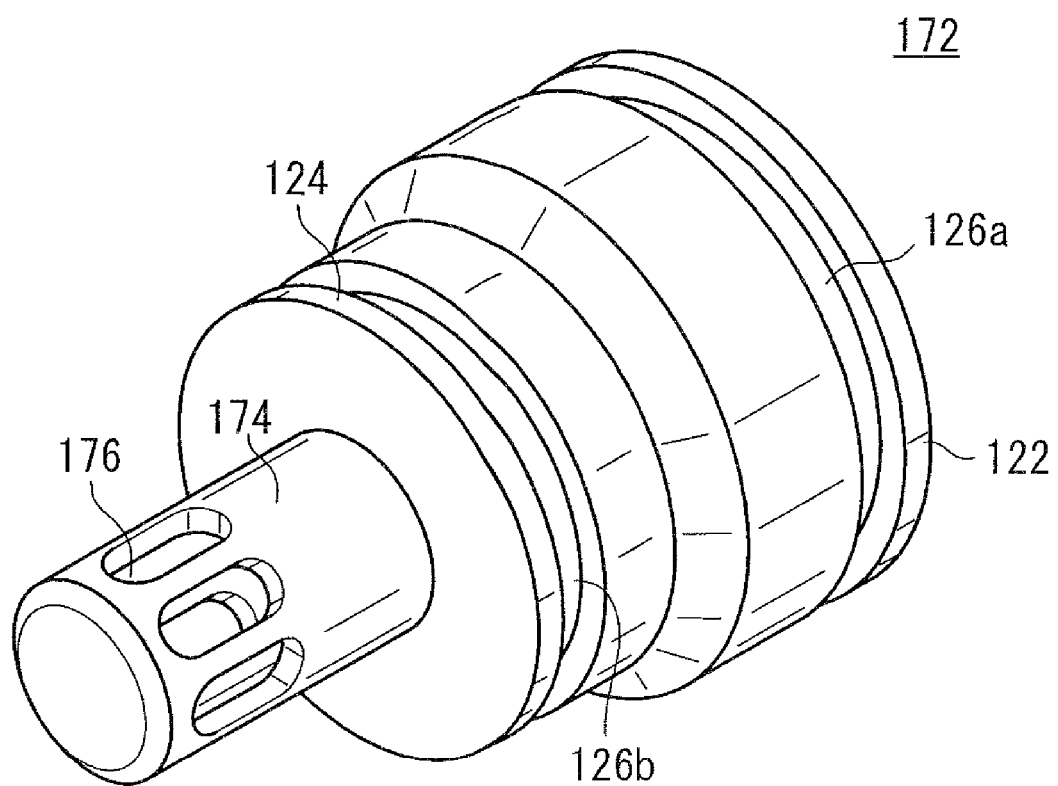
FIG. 12 is a perspective view showing a flow rectifier member of the fuel cell system.

The fuel cell system 170 includes a flow rectifier member 172 provided at a portion connecting the end plate 62b and the ejector 50. The flow rectifier member 172 is a cylindrical member. A cylindrical portion 174 with a further reduced diameter having a bottom is provided integrally with the front end of the small diameter portion 124. The cylindrical portion 174 protrudes into the fuel gas supply passage 76a. Elongated holes (openings) 176 are formed in the outer circumferential wall surface at the front end of the cylindrical portion 174 (see FIGS. 11 and 12).

In the fifth embodiment, the cylindrical portion 174 protrudes from the small diameter portion 124. The elongated holes 176 formed in the cylindrical portion 174 are positioned in the fuel gas supply passage 76a. In the structure, the flow of the fuel gas ejected from the diffuser 100 is rectified by the flow rectifier member 172, and the fuel gas is directly supplied to the fuel gas supply passage 76a through the elongated holes 176. Accordingly, static pressure distribution in the fuel gas supply passage 76a is effectively reduced, and the fuel gas is uniformly supplied to each of the power generation cells 60.

Figure 13:
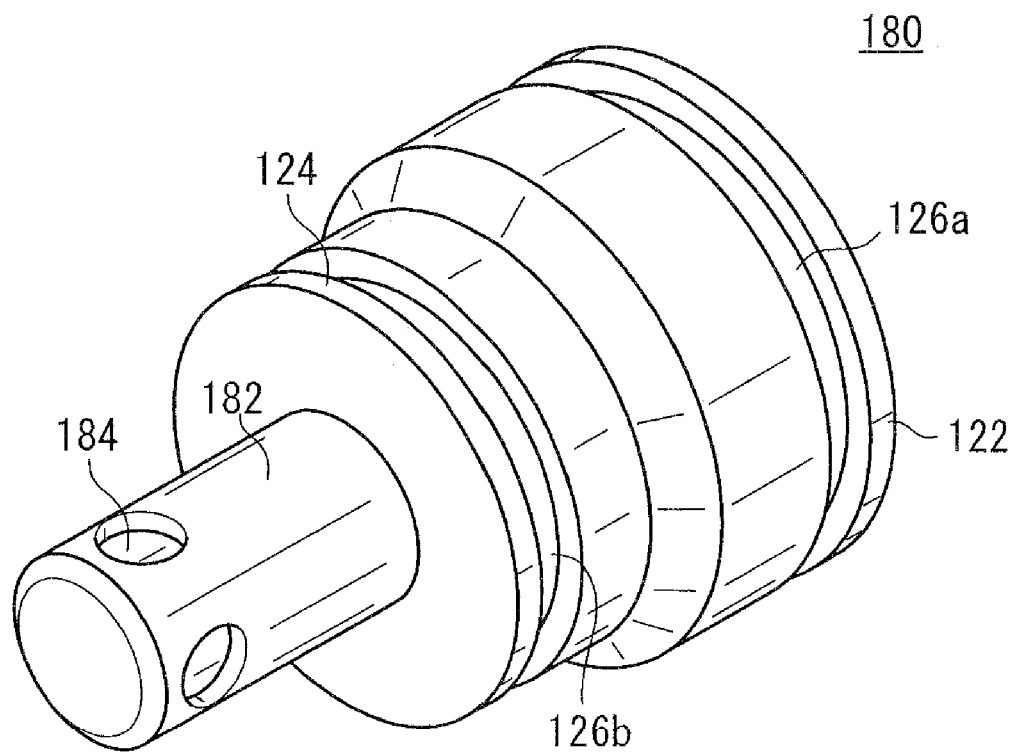
FIG. 13 is a perspective view showing a flow rectifier member of a fuel cell system according to a sixth embodiment of the present invention.

FIG. 13 is a perspective view showing a flow rectifier member 180 of a fuel cell system according to a sixth embodiment of the present invention.

The flow rectifier member 180 is cylindrical member. A cylindrical portion 182 having a bottom is provided integrally with the front end of the small diameter portion 124. A plurality of circular holes (openings) 184 are formed in the outer circumferential wall surface at the front end of the cylindrical portion 182.

Figure 14:
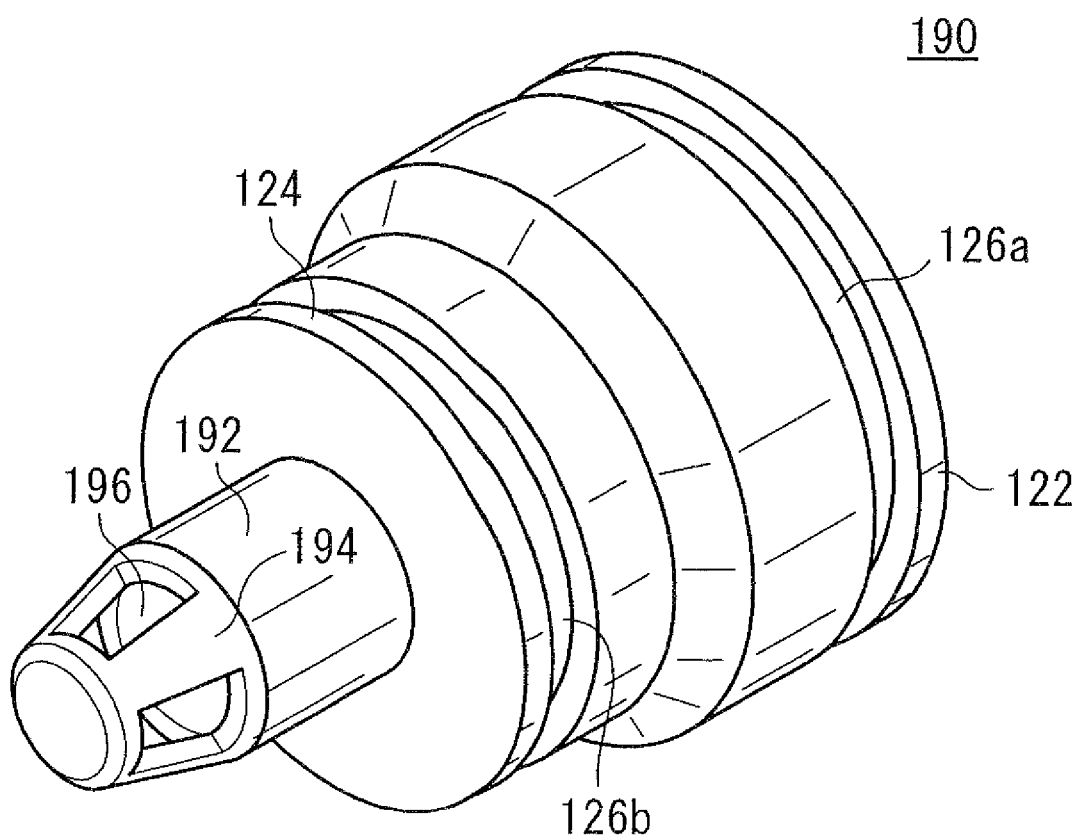
FIG. 14 is a perspective view showing a flow rectifier member of a fuel cell system according to a seventh embodiment of the present invention.
Figure 15:
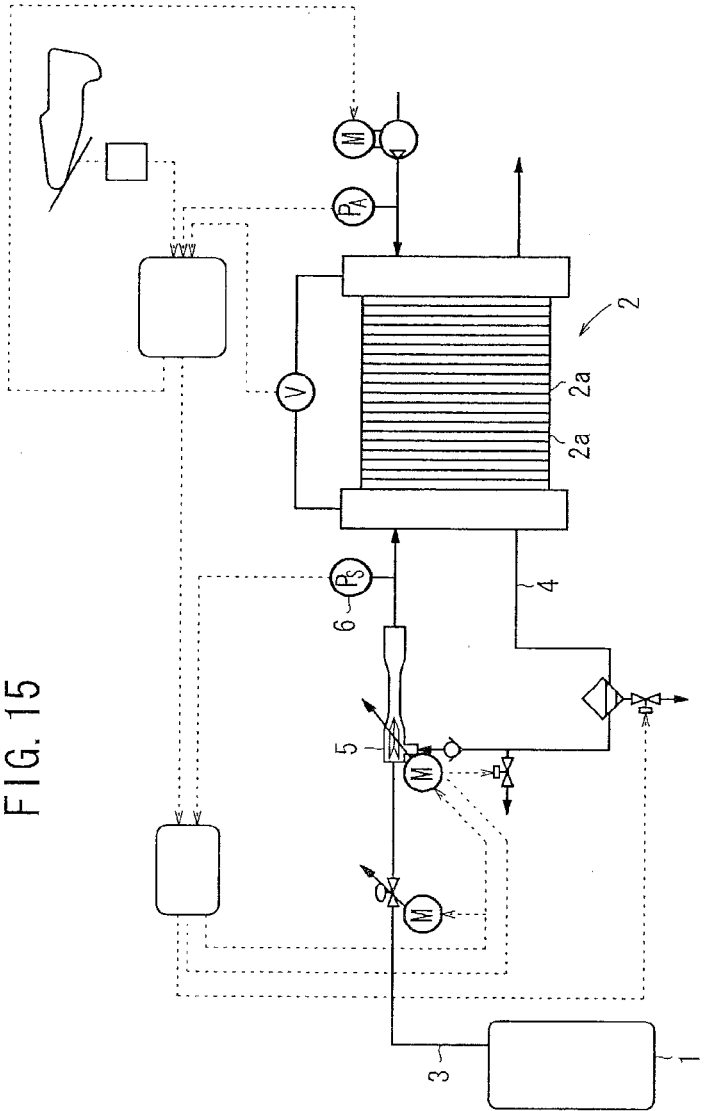
FIG. 15 is a diagram showing a fuel cell system disclosed in Japanese Laid-Open Patent Publication No. 2004-095528.

FIG. 14 is a perspective view showing a flow rectifier member 190 of a fuel cell system according to a seventh embodiment of the present invention.

The flow rectifier member 190 is a cylindrical member having a cylindrical portion 192 at the front end of the small diameter portion 124. A conical portion 194 is provided at the front end of the cylindrical portion 192, and a plurality of trapezoidal holes (openings) 196 are formed in the outer circumferential wall surface of the conical portion 194.

As described above, in the sixth and seventh embodiments, as in the case of the fifth embodiment, the circular holes 184 and the trapezoidal holes 196 are formed in correspondence with the fuel gas supply passage 76a. In the structure, the same advantages as in the case of the fifth embodiment are obtained. For example, the rectified fuel gas is suitably supplied to the fuel gas supply passage 76a.

While the invention has been particularly shown and described with reference to preferred embodiments, it will be understood that variations and modifications can be effected thereto by those skilled in the art without departing from the scope of the invention as defined by the appended claims.

What is claimed is:
1. A fuel cell system including:
    a fuel cell stack formed by stacking a plurality of power generation cells in a stacking direction, a reactant gas supply passage for supplying at least a fuel gas or an oxygen-containing gas as a reactant gas extending through the fuel cell stack in the stacking direction; and
    a reactant gas supply mechanism having an ejector for supplying the reactant gas to the reactant gas supply passage, and returning the reactant gas discharged from the fuel cell stack after consumption to the reactant gas supply passage, wherein the reactant gas supply mechanism includes a flow rectifier member for rectifying the reactant gas provided at a portion connecting the ejector and the reactant gas supply passage, and wherein the flow rectifier member is a cylindrical member, and the flow rectifier member connects a manifold provided at an end plate provided at one end of the fuel cell stack and a reactant gas outlet of the ejector, and the manifold is connected to the reactant gas supply passage.

2. A fuel cell system according to claim 1, wherein a plurality of openings connecting the ejector and the reactant gas supply passage are formed in a wall surface of the flow rectifier member.

3. A fuel cell system according to claim 1, wherein the reactant gas is the fuel gas, and the reactant gas supply passage is a fuel gas supply passage.

4. A fuel cell system according to claim 2, wherein the openings are inclined holes inclined from a flow direction of the reactant gas.

5. A fuel cell system according to claim 2, wherein the openings are holes forming a swirling flow in the reactant gas supply passage.

6. A fuel cell system according to claim 1, wherein the flow rectifier member further includes a cylindrical portion, and a plurality of holes are formed in an outer circumferential wall surface of the cylindrical portion.

7. A fuel cell system according to claim 6, wherein the holes are elongated holes.

8. A fuel cell system according to claim 6, wherein the holes are circular holes.

9. A fuel cell system according to claim 6, wherein the cylindrical portion has a conical portion, and a plurality of trapezoidal holes are formed in an outer circumferential wall surface of the conical portion.

* * * * *